(12) United States Patent
Sekihara et al.

(10) Patent No.: US 7,790,070 B2
(45) Date of Patent: Sep. 7, 2010

(54) MOLD ASSEMBLY FOR OPTICAL PARTS AND METHOD OF SETUP THEREOF

(75) Inventors: Kanji Sekihara, Toyokawa (JP); Akihiko Matsumoto, Toyokawa (JP); Yoshihiro Okumura, Toyohashi (JP)

(73) Assignee: Konica Minolta Opto, Inc., Tokyo (JP)

( * ) Notice: Subject to any disclaimer, the term of this patent is extended or adjusted under 35 U.S.C. 154(b) by 2 days.

(21) Appl. No.: 12/439,680

(22) PCT Filed: Aug. 27, 2007

(86) PCT No.: PCT/JP2007/066544
§ 371 (c)(1),
(2), (4) Date: Mar. 2, 2009

(87) PCT Pub. No.: WO2008/029653
PCT Pub. Date: Mar. 13, 2008

(65) Prior Publication Data
US 2009/0315198 A1     Dec. 24, 2009

(30) Foreign Application Priority Data
Sep. 5, 2006    (JP) .............................. 2006-239969

(51) Int. Cl.
*B29C 45/78* (2006.01)

(52) U.S. Cl. .................. 264/1.1; 264/328.16; 425/144; 425/182; 425/195

(58) Field of Classification Search .................. 264/1.1, 264/328.16; 425/144, 182, 183, 190, 195
See application file for complete search history.

(56) References Cited

U.S. PATENT DOCUMENTS

| | | | | |
|---|---|---|---|---|
| 5,882,695 A | * | 3/1999 | Starkey | 425/192 R |
| 7,044,726 B2 | * | 5/2006 | Koyama et al. | 425/192 R |

FOREIGN PATENT DOCUMENTS

| | | | |
|---|---|---|---|
| JP | 5-131506 | | 5/1993 |
| JP | 2005-199651 | | 7/2005 |
| JP | 2006-137142 | * | 6/2006 |
| JP | 2007-90790 | | 4/2007 |

* cited by examiner

*Primary Examiner*—Jill L Heitbrink
(74) *Attorney, Agent, or Firm*—Cohen Pontani Lieberman & Pavane LLP

(57) ABSTRACT

A mold assembly that is adapted to clamp fixed mold and movable mold together while making temperature adjustment and inject a molding material into a molding cavity provided therebetween, thereby producing an optical part. The mold assembly is one including fixed platen supporting fixed mold, provided on a part of its mold-side surface with locating hole and including ring of configuration with external and internal surfaces, fitted at its external surface in the locating hole, wherein the fixed mold is provided with a locating projection protruding toward the fixed platen, fitted in the internal surface of the locating hole, and wherein the ring consists of a material whose linear expansion coefficient is smaller than those of the material of the fixed platen and the material of the locating projection.

12 Claims, 6 Drawing Sheets

MOLD ASSEMBLY FOR OPTICAL PARTS AND METHOD OF SETUP THEREOF

FIELD OF THE INVENTION

The present invention relates to a mold assembly for producing optical parts by injection molding and the method of setup thereof wherein the mold assembly is mounted on or dismounted from an injection molding machine, particularly to a mold assembly for optical parts and a method of setup thereof for ensuring that a mold is mounted accurately on the platen of the mold assembly without being misaligned at least during the execution of the molding operation.

BACKGROUND OF THE INVENTION

To perform setup operations on an injection molding machine in the conventional art, a fixed mold and a movable mold fitted to each other are lifted by a crane and are mounted on a fixed platen of the mold assembly. In this case, a locating ring is used to adjust the nozzle centers of the fixed mold and fixed platen. For example, a locating ring is mounted on the fixed mold and is fitted into the locating hole provided on the fixed platen. In this case, the diameter of the locating ring is generally formed smaller than the locating hole diameter by about 30 μm. This is because a crane is used, and accurate positioning cannot be performed.

Another embodiment can be found in Patent Document 1 which discloses a mold positioning device wherein a locating ring is provided around the nozzle center of the fixed platen, and the mold is provided with a locating ring engaging hole. The apparatus of this Patent Document is claimed to ensure easy positioning of the mold into the fixed platen of the molding machine, independently of the external size of the mold.

However, the mold positioning device disclosed in Patent Document 1 also uses a mold setup method using a crane, and there is a limit to the positioning accuracy. The locating ring machining accuracy is also limited. Thus, a certain degree of clearance has to be provided between the locating ring and locating ring engaging hole. The positioning accuracy has been limited because of this clearance.

Further, the fixed platen is generally made of cast iron. Thus, when a locating hole is formed on the fixed platen, the forming accuracy and surface roughness have been difficult to improve. The mold is commonly made of a material (e.g., carbon steel) which is tougher than the fixed platen. Thus, the locating hole of the fixed platen tends to be deformed by repeated mold setup procedures. If the locating hole is deformed, the clearance with the mold is increased and the positioning accuracy is reduced. These problems have been left unsolved.

Patent Document 1: Japanese Unexamined Patent Application Publication No. 9-11241

DISCLOSURE OF INVENTION

The present invention has been made to solve the aforementioned problems which the conventional mold positioning device has. The object of the present invention is to provide a mold assembly for optical parts and a setup method thereof wherein the time-dependent reduction in positioning accuracy can be minimized and the positioning accuracy at the time of molding can be further enhanced.

The mold assembly for optical parts of the present invention made to solve the aforementioned problems is designed to clamp a fixed mold and a movable mold while adjusting the temperature and to inject the molding material into a molding cavity provided therebetween, whereby optical parts are produced. The mold assembly contains a holding member for holding the fixed mold, wherein a locating hole is formed on a part of the surface on the mold side, and a locating member having external and internal surfaces wherein the external surface is adapted to be fitted into the locating hole. A locating projection protruding toward the holding member and being adapted to be fitted into the internal surface of the locating member is formed on the fixing mold, and the locating member is formed of a material having a smaller coefficient of linear expansion than those of the holding member and locating projection.

The setup method of the mold assembly for optical parts of the present invention is intended for the mold assembly for optical parts designed to clamp a fixed mold and a movable mold while adjusting the temperature and to inject the molding material into a molding cavity provided therebetween, whereby optical parts are produced, the setup method using:

fixed and movable molds wherein at least one of these molds contains a locating projection protruding toward the side opposite to the mold matching surface;

a holding member for holding at least one of these molds wherein a locating hole is formed on a part of the surface on the mold side; and a locating member formed of a material having a smaller linear expansion coefficient than the materials of the holding member and locating projection, and having external and internal surfaces, wherein the external surface is adapted to be fitted into the locating hole, and the internal surface is adapted to be fitted by the locating projection;

the setup method including:

a first step for making adjustments to reach the first temperature of the holding member meeting the following relationship:

$$t1+40 \leq \text{first temperature} \leq t1+60(°\text{ C.})$$

(wherein "t1" indicates the temperature of the holding member at the time of molding optical parts in this mold assembly);

a second step for installation of the locating member into the holding member under the temperature condition obtained in the first step;

a third step of adjusting the temperature of the holding member within the range of $t1 \pm 5$ (° C.) and adjusting at least one of the molds to the second temperature meeting the following relationship:

$$\text{Second temperature} \leq t1-10(°\text{ C.});$$

a fourth step for mounting the locating member with the locating projection of at least one of the molds under the temperature condition obtained in the third step; and a fifth step for adjusting the temperature of at least one of the molds within the range of $t2 \pm 5$ (° C.) (wherein "t2" denotes the temperature of at least one of the molds at the time of molding optical parts in this mold assembly).

In the setup method for the mold assembly for optical parts of the present invention, a locating member is formed of a material having a smaller linear expansion coefficient than the materials of the holding member and the mold. Thus, the sizes of these members can be changed to some extent by changing the temperature. If the locating member is mounted on the holding member wherein the holding member has the first temperature, and the mold is then mounted on the locating member mounted on the holding member wherein the mold has the second temperature, the holding member and mold can be mounted through the locating member. The same setup procedure can be used to mount the fixed mold and holding member thereof, and to mount the movable mold and movable holding member.

The setup method of the mold assembly for optical parts of the present invention is intended for the mold assembly for optical parts designed to clamp a fixed mold and a movable mold while adjusting the temperature and to inject the molding material into a molding cavity provided therebetween, whereby optical parts are produced, the setup method using:

fixed and movable molds wherein at least one of these molds contains a locating projection protruding toward the side opposite to the mold matching surface;

a holding member for holding at least one of these molds, wherein a locating hole is formed on a part of the surface on the mold side; and a locating member formed of a material having a smaller linear expansion coefficient than the materials of the holding member and locating projection, and having external and internal surfaces, wherein the external surface is adapted to be fitted into the locating hole, and the internal surface is adapted to be fitted by the locating projection;

the setup method including:

a first step for adjusting the temperature of the holding member within the range of $t1 \pm 5$ (° C.) starting from the state wherein the holding member is mounted with locating member, and the locating member is mounted with the locating projection of at least one of the molds, and for adjusting the temperature of at least one of the molds to the second temperature meeting the following relationship:

$$\text{Second temperature} \leq t1 - 10(° \text{C.});$$

a second step for removing the locating projection of at least one of the molds from the locating member under the temperature condition obtained in the first step;

a third step for adjusting the holding member to the first temperature meeting the following relationship:

$$t1 + 40 \leq \text{first temperature} \leq t1 + 60(° \text{C.}); \text{and}$$

a fourth step for removing the locating member from the holding member under the temperature condition obtained in the third step.

BEST MODE FOR CARRYING OUT THE INVENTION

Figure 1:
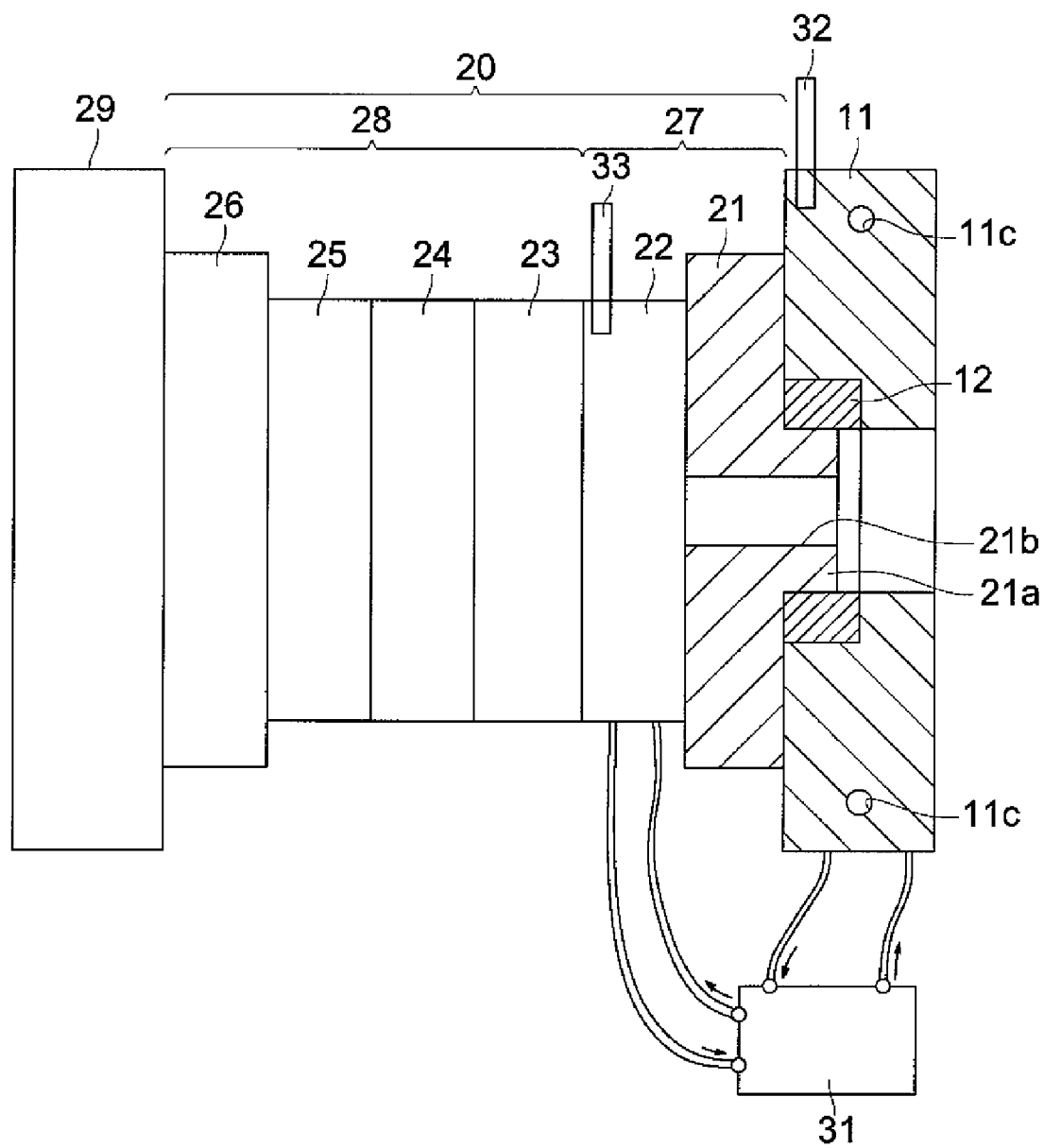
FIG. 1 is a schematic diagram showing a mold positioning device of the present embodiment.

In the mold assembly for optical parts of the present invention, the external surface of the locating member is fitted into the locating hole of the holding member, and the locating projection of the fixed mold is fitted into the internal surface of the locating member. To put it another way, the holding member and fixed mold are assembled through the locating member. In this case, the locating member is formed of a material having a smaller linear expansion coefficient than those of the holding member and locating projection. Thus, the relationship of their sizes can be changed by changing the temperature in such a way that there is some allowance at the time of mounting or dismounting, and complete fitting is achieved without any clearance at the time of molding. This arrangement suppresses time-dependent reduction of the positioning accuracy and further enhances the positioning accuracy at the time of molding.

In the present invention, a temperature adjusting device is preferably provided to control the temperature of the holding member. If not only the temperature of the mold but also that of the holding member can be controlled, easy adjustment of the temperature relationship can be achieved between the holding member and locating member.

In the present invention, the linear expansion coefficient of the material constituting the locating member is preferably $5 \times 10^{-6}$/K or less, more preferably in the range from $0.1 \times 10^{-6}$ through $2.0 \times 10^{-6}$/K. If this kind of material is used, a material having a linear expansion coefficient smaller than that of the material commonly used in the holding member or fixed mold has been selected.

The present invention is preferably provided with a movable side holding member for holding the movable mold wherein a second locating hole is formed on a part of the surface on the mold side, and a movable side locating member having external and internal surfaces wherein the outer surface is fitted into the second locating hole. Further, a movable side locating projection protruding toward the movable side holding member and fitted onto the internal surface of the movable side locating member is preferably formed on the movable mold. Furthermore, the movable side locating member is preferably made of a material having a linear expansion coefficient smaller than those of the materials of the movable side holding member and movable side locating projection. This arrangement improves the positioning accuracy between the fixed mold and the holding member thereof as well as the positioning accuracy between the movable mold and the holding member thereof.

According to the setup method of the mold assembly for optical parts of the present invention, both the holding member and fixed mold, and the movable side holding member and movable mold can be easily dismounted.

In the setup method of the mold assembly for optical parts of the present invention, the holding member to be used is preferably designed in such a way that the diameter of the locating hole is greater than the diameter on the external surface of the locating member by the range of 20 through 60 μm at the first temperature. At least one of the molds to be used is preferably designed in such a way that the diameter of the locating projection at room temperature is smaller than the diameter of the internal surface of the locating member at the second temperature by the range from 15 through 90 μm.

The setup method of the mold assembly for optical parts of the present invention ensures easy mounting and dismounting of the holding member and locating member at the first temperature, and easy mounting and dismounting of the locating member and mold at the second temperature. At the time of molding, furthermore, the holding member, locating member and molds are fixed to one another almost without any clearances. Thus, the positioning accuracy of the mold assembly of the present invention is further enhanced.

The following describes the best form of embodiment of the present invention with reference to drawings. This embodiment is a case of applying the present invention to a mold assembly used for injection molding of the optical parts and others and the method for setup thereof.

As shown in FIG. 1, the mold assembly of the present embodiment includes a mold set 20, a fixed platen 11 and a ring 12 for positioning them. The fixed platen 11 forms part of an injection molding machine, and is fixed at a predetermined position. This fixed platen 11 corresponds to the holding member. The surface on left side of the fixed platen in FIG. 1 corresponds to the surface on the mold side.

Figure 2:
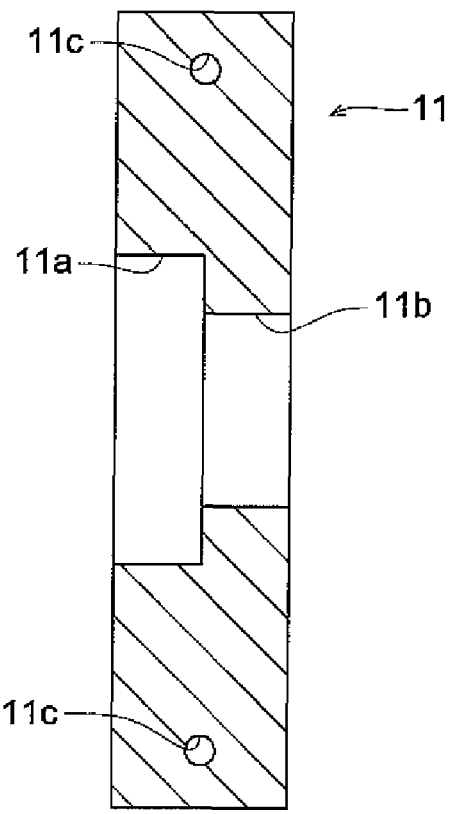
FIG. 2 is a cross sectional view of a fixed platen.

The center of the fixed platen 11 is provided with stepped through-holes 11a and 11b as shown in FIGS. 1 and 2. Among the through-holes, the one having a large diameter on the left side in the figures is a locating hole 11a, and the one having a small diameter on the right side on the figures is a nozzle hole 11b. They are formed as an integral part and serve to control the position at the time of mold setup. They also serve as clearance holes at the time of nozzle touch of the injection sleeve nozzle.

Figure 3:
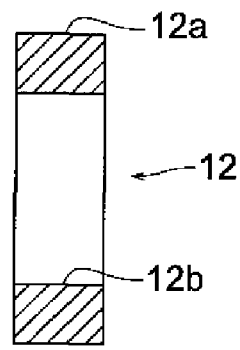
FIG. 3 is a cross sectional view of a ring.

As shown in FIGS. 1 and 3, the ring 12 is a circular member. The cylindrical surface on the large diameter side is the external surface 12a, and that on the small diameter side is the internal surface 12b. As shown in FIG. 1, the external surface 12a has almost the same diameter as the locating hole 11a of the fixed platen 11. The external surface 12a of this ring is fitted into the locating hole 11a. The axial length as the length in the lateral direction of the ring 12 in FIG. 1 is slightly smaller than the depth of the locating hole 11a. This ring 12 corresponds to the locating member.

The mold set 20 includes a fixed side mounting plate 21, fixed side template 22, movable side template 23, holder plate 24, spacer block 25, and movable side mounting plate 26 in the order starting from the left. In this case, these components are integrally fixed with one another by bolts or pins. FIG. 1 shows the cross section of only the three components, that is, fixed platen 11, ring 12, and fixed side mounting plate 21. Other components are shown in the side view.

The set of the fixed side mounting plate 21 and fixed side template 22 constitutes a fixed mold 27, and the set of other components such as movable side template 23, holder plate 24, spacer block 25, and movable side mounting plate 26, constitute the movable mold 28. To be more specific, the mold set 20 is shown as an integral unit in FIG. 1. When the optical parts are actually manufactured upon completion of setup work, the fixed side template 22 is separated from the movable side template 23. To be more specific, the fixed mold 27 and fixed platen 11 are fixed but the movable mold 28 is moved in the lateral direction in FIG. 1 by a movable platen 29.

In the fixed mold 27, the fixed side mounting plate 21 located closest to the fixed platen 11 includes a locating projection 21a protruding in an approximately cylindrical form toward the right of the drawing, as shown in FIG. 1. The locating projection 21a need not always be integral with the fixed side mounting plate 21. The locating projection 21a is fitted into the internal surface 21b of the ring 12. Further, a spool 21b as a molten resin passage is formed on the fixed side mounting plate 21 by penetrating the locating projection 21a. In the drawing, the spool 21b is shown as a simple cylindrical hole, but it is generally produced in a form suited to resin injection.

As shown in FIG. 1, a flow path 11c is formed inside the fixed platen 11 and is connected with a medium type temperature controller 31. The medium type temperature controller 31 circulates a heating medium such as oil by controlling its temperature, whereby the temperature of the fixed platen 11 is controlled. Further, flow paths are formed on both the fixed mold 27 and movable mold 28. Each temperature is controlled independently by the medium type temperature controller 31. To be more specific, the medium type temperature controller 31 can provide control in such a way that the fixed mold 27 and fixed platen 11 have different temperatures. Further, as shown in FIG. 1, the fixed platen 11 and fixed side template 22 of the fixed mold 27 are provided, for example, with K-thermocouple rod sensors 32 and 33 as temperature detecting members.

The following describes the material of the fixed platen 11, ring 12, and fixed side mounting plate 21. The fixed platen 11 of the present embodiment is made of cast iron, similarly to the case of the conventional platen. For example, the fixed platen 11 is made of ductile cast iron. Similarly to the case of the fixed side template 22, the fixed side mounting plate 21 is made of the carbon steel (e.g., S55C) which is commonly used to manufacture molds. By contrast, the ring 12 is made of a material that has a smaller linear expansion coefficient than the materials of the fixed platen 11 and fixed side mounting plate 21, as shown in the following Table.

TABLE 1

| Member | Material | Linear expansion coefficient |
|---|---|---|
| Ring | ar | $2.0 \times 10^{-6}$/K or less |
| Ring | Super invar | $1.0 \times 10^{-6}$/K or less |
| Ring | Stainless invar | $1.0 \times 10^{-6}$/K or less |
| Fixed platen | Ductile cast iron | $11\text{-}12 \times 10^{-6}$/K |
| Mold | Mold steel (e.g., STAVAX (registered trademark)) | $11 \times 10^{-6}$/K |
| Mold | S55C | $11.7 \times 10^{-6}$/K |
| Structure parts | SUS304 | $17.3 \times 10^{-6}$/K |

As illustrated above, the linear expansion coefficient of cast iron and carbon steel is in the range of about 11 through $12 \times 10^{-6}$/K. By contrast, for example, the linear expansion coefficient of invar is $2.0 \times 10^{-6}$/K or less, which is one fifth or less. As described above, the material of the ring 12 preferably has a linear expansion coefficient of $5 \times 10^{-6}$K or less, or more preferably in the range from $0.1 \times 10^{-6}$ through $2.0 \times 10^{-6}$/K. Thus, when the temperature has been changed to a predetermined level, the fixed platen 11 and fixed side mounting plate 21 exhibit greater expansion and shrinkage, but the expansion and shrinkage ratio of the ring is smaller. Table 3 shows three materials for the ring 12. Any one of these materials can be used to get the same advantage.

Thus, the relationship between the diameter of the locating hole 11a of the fixed platen 11 and that of the external surface 12a of the ring 12 varies according to the temperatures of the fixed platen 11 and ring 12. If the fixed platen 11 and ring 12 have been formed so that their diameters are equal to each other at a predetermined temperature, the diameter of the locating hole 11a will be greater than that of the external surface 12a if the fixed platen 11 expands more than the ring 12 at a higher temperature. To be more specific, a tight or loose state will occur depending on the temperature.

The same situation occurs in the relationship between the diameter of the internal surface 12b of the ring 12 and the external diameter of the locating projection 21a. In this case, if the ring 12 and fixed side mounting plate 21 are produced in such a way that their diameters will be equal to each other at a predetermined temperature, the fixed side mounting plate 21 shrinks much more than the ring 12 at a lower temperature, whereby the diameter of the locating projection 21a is reduced below that of the internal surface 12b. To be more specific, a tight or loose state occurs between them depending on the temperature. This relationship is used in the setup procedure for the mold assembly of the present invention.

When the optical parts are manufactured upon completion of the setup procedure of the mold assembly of the present embodiment, the fixed platen 11 and fixed mold 27 are controlled to different temperature levels by the medium type temperature controller 31. It is common practice to adjust the temperature of the fixed side template 22 to the level of 100 through 150° C. at the time of molding, and the temperature of the platen to the range of 60 through 70° C. at the time of molding. Thus, the sizes of various members may be determined in such a way that complete fixing is achieved between the locating hole 11a and external surface 12a of the ring 12, and between the internal surface 12b of the ring 12 and locating projection 21a at the temperature during the molding operation. To be more specific, it is preferred that the outer diameter of the internal member should be equal to or slightly greater than the inner diameter of the external member.

The following describes the mold assembly setup method. In the general mold setup procedure, the mold set 20 integrally made up of a movable mold and a fixed mold lifted by a crane, and the fixed side mounting plate 21 is fixed on the fixed platen 11 of an injection molding machine. The members of the mold set 20 are accurately positioned in an integrated state. After that, the movable platen 29 is moved close to the mold set 20, and the movable platen 29 and movable side mounting plate 26 are fixed onto each other. Basically the same procedure is used in the present embodiment as well. This embodiment is characterized by the process of fastening the fixed platen 11 and fixed side mounting plate 21.

Figure 6:
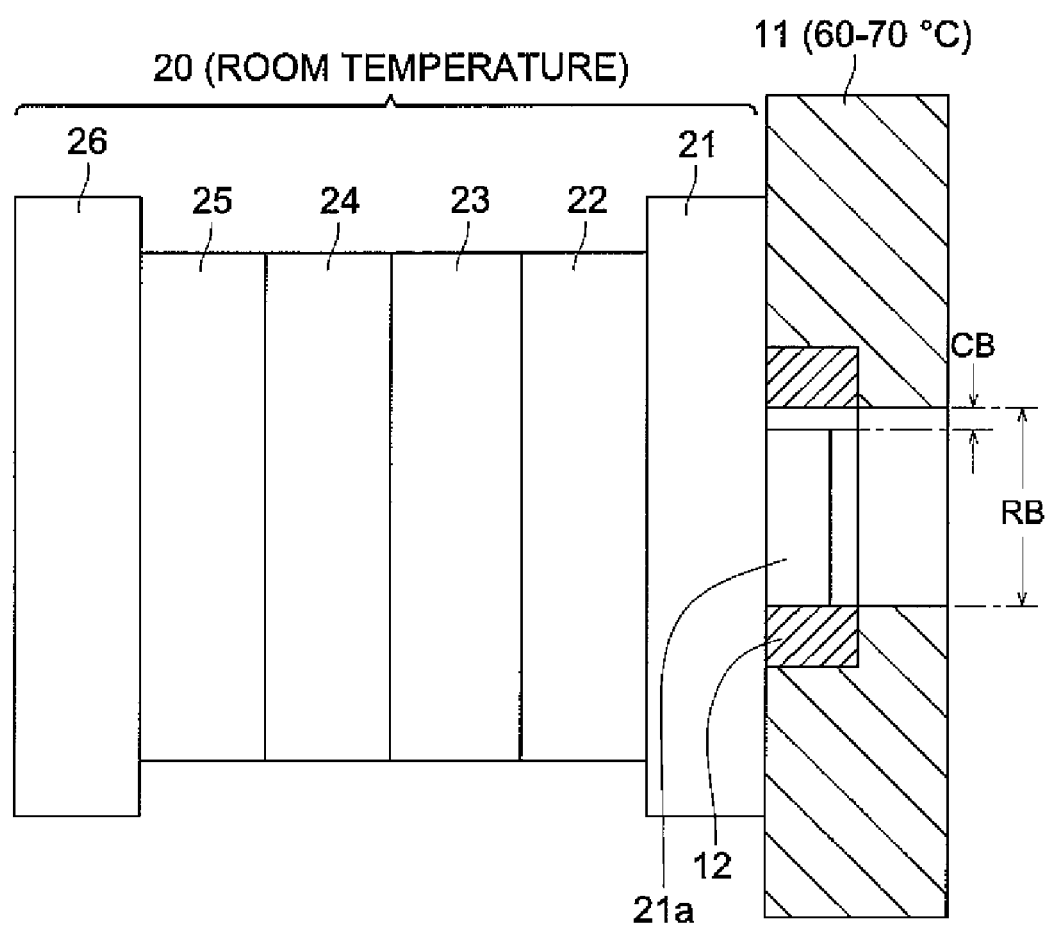
FIG. 6 is an explanatory diagram representing the positioning procedure.
Figure 7:
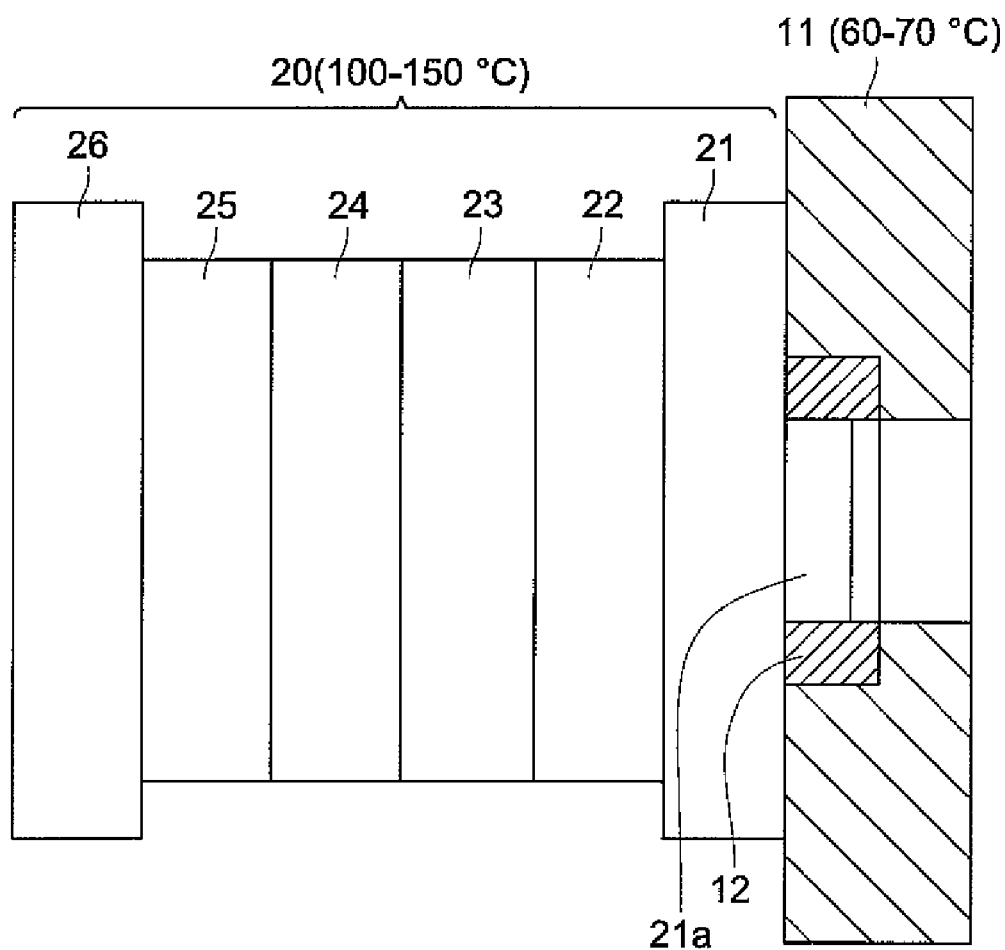
FIG. 7 is an explanatory diagram representing the positioning procedure.

In the mold setup procedure of the present embodiment, the fixed platen 11, ring 12, and fixed side mounting plate 21 made of the aforementioned materials are mounted according to the procedures in the following steps (1) ring insertion step (FIG. 4), (2) ring fixing step (FIG. 5), (3) mold insertion step (FIG. 6), and (4) mold fixing step (FIG. 7).

Figure 4:
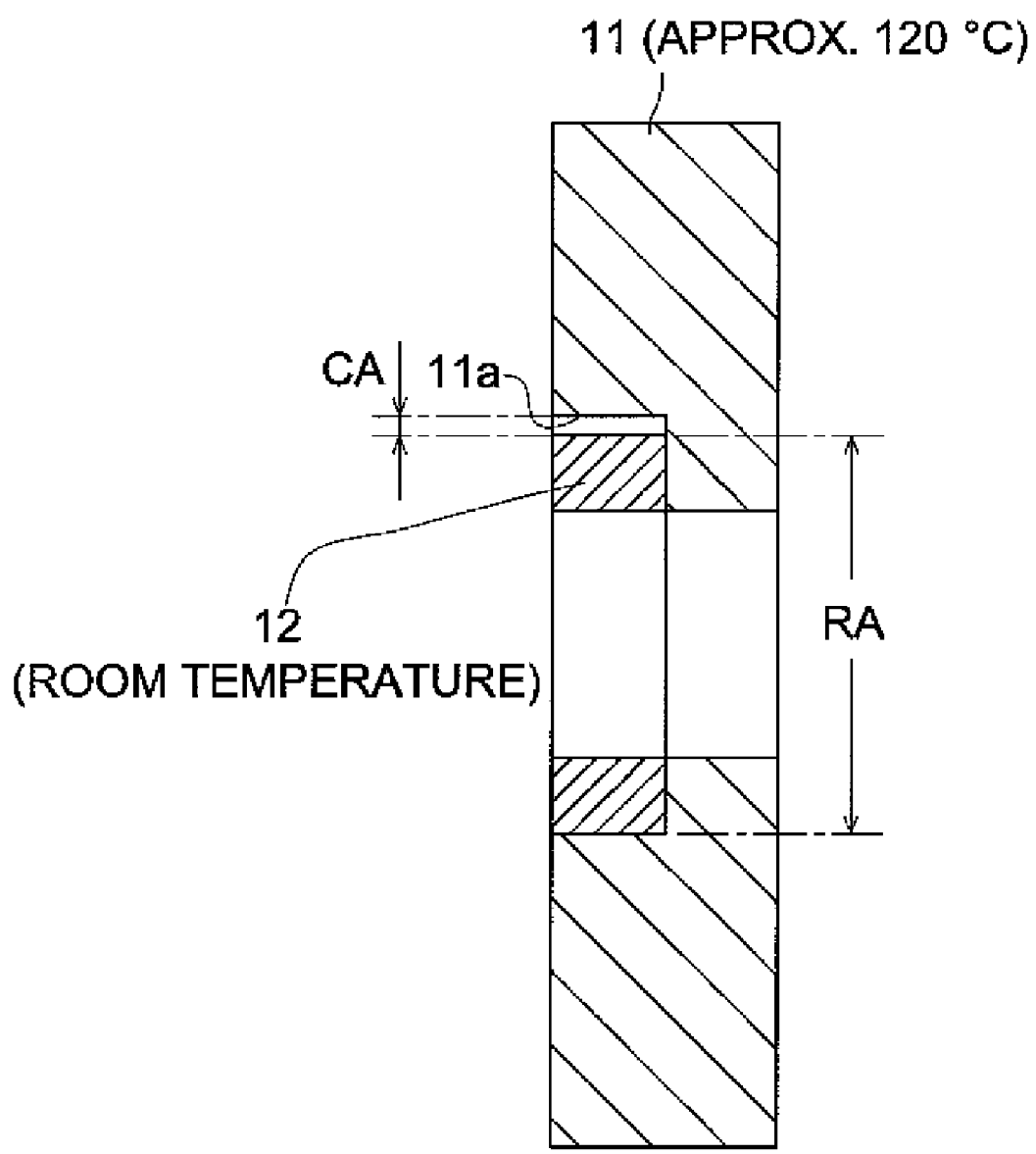
FIG. 4 is an explanatory diagram representing the positioning procedure.

In Step (1), the temperature of the fixed platen 11 is raised to about 120° C., that is, to a level higher than the temperature at the time of molding by 40 through 60° C. by the medium type temperature controller 31. This arrangement causes the fixed platen 11 to expand much more than at the temperature during the molding operation. This means that the inner diameter of the locating hole 11a is increased over the level at the temperature during the molding operation. The diameter of about 100 mm is increased in the range from 20 through 60 μm for example. Then the ring 12 at the room temperature (diameter RA) is inserted therein, as shown in FIG. 4.

In this case, the outer diameter of the ring 12 is determined to ensure that the inner diameter of the locating hole 11a at about 120° C. is greater by some margin (clearance CA in the drawing) than the outer diameter of the ring 12 at room temperature. The clearance CA is preferably in the range of 30 through 50 μm. For the sake of explanation, the drawings show the clearance in a size much greater than the actual size.

Step (2) reduces the temperature of the fixed platen 11 having been raised to about 120° C. in Step (1). For example, this temperature is reduced to about 60 through 70° C. This is equivalent to the temperature of the fixed platen 11 at the time of molding operation. This arrangement causes the fixed platen 11 to shrink from the level in the Step (1), and also reduces the inner diameter of the locating hole 11a. In the meantime, the ring 12 is not placed under temperature control. However, since it is kept in contact with the fixed platen 11, the temperature is raised by the heat of the fixed platen 11 to some extent. However, since the ring 12 is made of a material having a smaller linear expansion coefficient, there is hardly any change in the outer diameter of the ring 12, despite a change in temperature.

Figure 5:
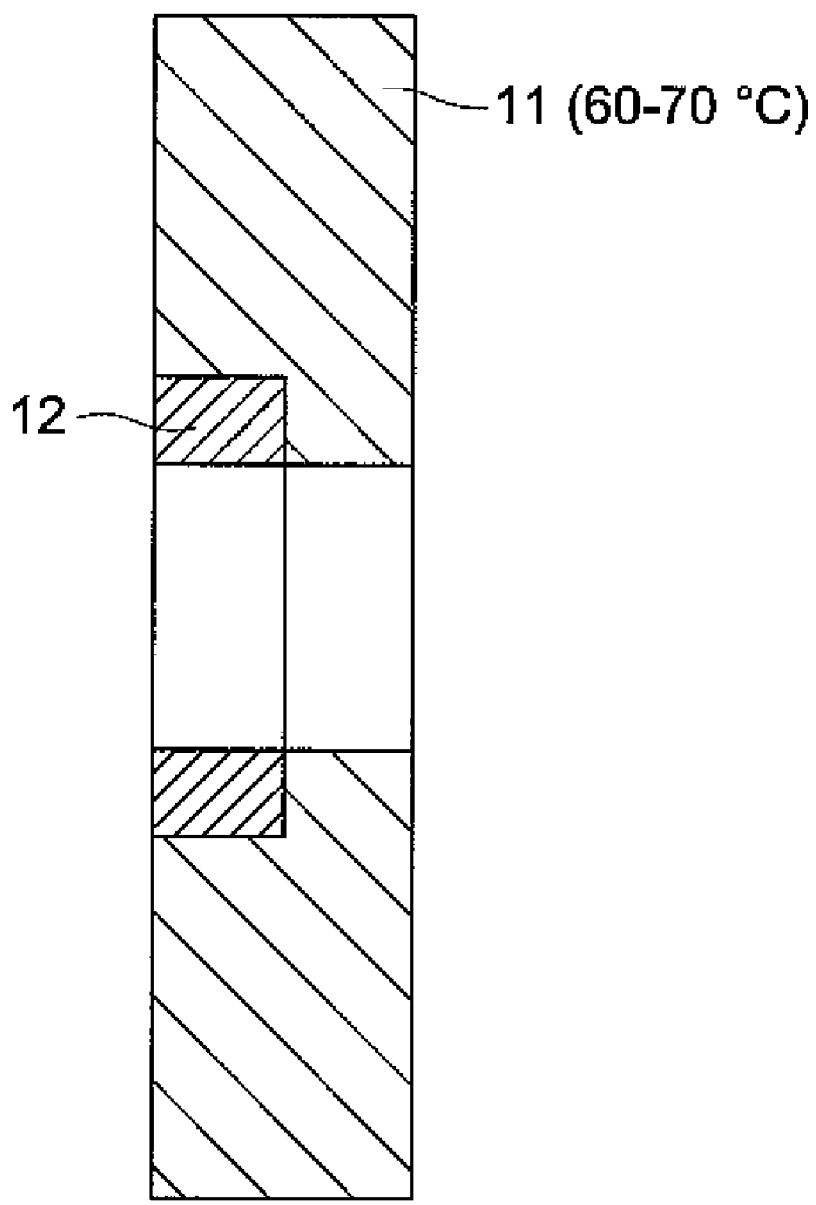
FIG. 5 is an explanatory diagram representing the positioning procedure.

Since the inner diameter of the locating hole 11a is reduced and the outer diameter of the ring 12 remains almost unchanged, the clearance is reduced. The sizes of components are determined so that the inner diameter of the locating hole 11a will be equal to or slightly smaller than the outer diameter of the ring 12 at about 60 through 70° C. This arrangement causes a shrinkage fit to be formed between the fixed platen 11 and ring 12, as shown in FIG. 5, and fixing is achieved without any clearance.

In Step (3), the mold set 20 as an integral body is lifted by a crane, as shown in FIG. 6, and the locating projection 21a of the fixed side mounting plate 21 is inserted into the inner diameter of the ring 12. In this case, the fixed platen 11 is kept at a temperature of about 60 through 70° C. of Step (2). The ring 12 is also maintained at about this temperature. In the meantime, the mold set 20 at this time is assumed to be kept at room temperature.

The sizes of components are determined to ensure that the inner diameter (inner diameter RB in FIG. 6) of the ring 12 is greater by some margin (clearance CB in the drawing) than the outer diameter of the locating projection 21a of the fixed side mounting plate 21 at room temperature. The clearance CB is required to be maintained in the range of about 20 through 40 μm. For example, when the outer diameter of the locating projection 21a is about 80 mm, the clearance CB can be kept in the range of about 15 through 90 μm. When this is the amount of clearance, Step (3) can be performed by the conventional method of using a crane.

The locating projection 21a of the mold set 20 in this case is not brought in direct contact with the fixed platen 11, because it is protected by the ring 12. Thus, even if the fixed platen 11 is made of cast iron, there is no need to worrying about deformation. Since the ring 12 is made of a material characterized by excellent toughness, there is almost no possibility of deformation, despite several collisions with the locating projection 21a of the mold set 20 in repeated setup procedures. Should there be any sign of deformation on the internal surface 12b of the ring 12, only the ring 12 can be easily replaced. The frequency of replacing the ring 12 is very small.

In Step (4), the mold is heated to the temperature at the time of molding. Namely, the temperature of the mold set 20 is raised to the level from about 100 through 150° C. This arrangement also raises the temperatures of the fixed side mounting plate 21 and locating projection 21a This causes some expansion of the fixed side mounting plate 21 and locating projection 21a, as shown in FIG. 7. The platen temperature is kept at the level of about 60 through 70° C. The ring 12 is made of a material having a low linear expansion coefficient. Thus, there is almost no change in the inner diameter of the ring 12. Thus, the clearance CB between the ring 12 and the locating projection 21a is reduced.

The sizes of the components are determined to ensure that the inner diameter of the ring 12 will be equal to or slightly smaller than the outer diameter of the locating projection 21a at 100 through 150° C. at this time. This arrangement causes a shrinkage fit to be achieved between the ring 12 and locating projection 21a, as shown in FIG. 7, and fixing is achieved without any clearance. This procedure ensures the fixed platen 11 to be firmly fixed to the fixed side mounting plate 21 of the fixed mold 27 at the temperature during the molding operation.

If the aforementioned method is used, some clearance is provided when the ring 12 is inserted in position in Step (1) or mold setup operation is performed in Step (3). Thus, high-precision positioning is not required at the time of insertion. Further, undue force will not be applied. In Steps (2) and (4), the effect of shrinkage fit can be achieved by changing the temperature. To put it another way, clearance is eliminated by the difference in linear expansion coefficient and reliable fixing is ensured. This arrangement ensures the fixed mold 27 to be accurately fixed onto the fixed platen 11 through the ring 12 at the temperature during the molding operation.

Upon completion of Steps (1) through (4), the movable platen 29 and movable side mounting plate 26 are fixed with the temperature kept unchanged. To be more specific, the movable platen 29 is brought in engagement with the left side of the movable mold 28 (in FIG. 1) under this condition, and the movable platen 29 and movable side mounting plate 26 are fixed by screws and other means. This allows the fixed side template 22 to be disengaged from the movable side template 23. This arrangement permits the movable mold 28 to be removable from and attachable to the fixed mold 27 having been fixed in position. Then a molten resin is injected into the molding cavity between the fixed side template 22 and movable side template 23 while the molds are clamped, whereby optical parts are produced.

When disengaging, the aforementioned procedure is reversed. To be more specific, the state of the Step (4) is reached immediately after molding. Accordingly, heating of the mold set 20 is suspended until the temperature is reduced to room temperature. In this case, the temperature control of the fixed platen 11 is not suspended. This procedure introduces the state of Step (3) and a clearance is formed between the ring 12 and locating projection 21a. This allows the mold set 20 to be removed from the fixed platen 11. When setting up another mold, another mold set at room temperature is mounted in position in this state.

Alternatively, when time has passed after molding, and both the fixed platen 11 and mold set 20 are at room temperature, only the fixed platen 11 is heated. This procedure introduces the state of Step (3) and a clearance is formed between the ring 12 and locating projection 21a. This allows the mold set 20 to be removed from the fixed platen 11.

When removing the ring 12 from the fixed platen 11 subsequent to removal of the mold set 20, the fixed platen 11 is further heated. This procedure introduces the state of Step (1) and a clearance is formed between the ring 12 and locating hole 11a. This allows the ring 12 to be removed from the fixed platen 11.

Using the ring having an outer diameter RA of about 80 mm made of the aforementioned material, the present inventors conducted a test, wherein the fixed platen 11 and mold set 20 were made of the same materials as the conventional ones. In the first place, the inner diameter of the locating hole 11a of the fixed platen 11 was determined to ensure that a clearance CA of about 40 μm would be obtained in Step (1). If there is this amount of clearance, insertion is generally possible with a sufficient margin. Further, when the temperature of the fixed platen 11 was raised from about 120° C. to the level of 60 through 70° C., the diameter of the locating hole 11a was reduced by about 44 μm. This amount of shrinkage was greater than the aforementioned clearance CA, and it was verified that the ring 12 was subjected to a shrinkage fit by the fixed platen 11 in Step (2).

Further, for the mold set 20, the fixed side mounting plate 21 including the locating projection 21a having an outer diameter of about 60 mm at the time of usage was tested. In Step (3), a locating projection 21a was formed to ensure that a clearance CB of about 30 μm would be obtained between the inner diameter of the ring 12 at 60 through 70° C. and the outer diameter of the locating projection 21a. If there is this amount of clearance, insertion is generally possible with a sufficient margin by using a general setup method. Further, when the temperature of the mold set 20 was raised to 100 through 150° C., the outer diameter of the locating projection 21a was increased by about 35 μm. This amount of expansion was greater than the aforementioned clearance CB, and it was verified that the fixed side mounting plate 21 was subjected to a shrinkage fit by the ring 12.

As described above in detail, according to the mold assembly of the present embodiment, high-precision positioning is not required in the mold setup phase, and therefore, it is possible to employ the conventional method by using a crane. After that, the platen temperature adjustment and mold temperature adjustment are combined, whereby reliable fixing is ensured at the temperature during the molding operation because of the difference in linear expansion coefficients of the fixed platen 11, ring 12, and fixed side mounting plate 21. This arrangement minimizes the time-dependent reduction in the positioning accuracy, and further enhances the positioning accuracy during molding operation. The examples of the resin preferably used for the molding operation include the resins based on polyolefin, polycarbonate, polyester, acryl, norbornane, and silicon.

In the mold assembly of the present embodiment, the locating projection 21a of the mold set 20 is not brought in direct contact with the fixed platen 11. Only the ring 12 comes in contact with the locating hole ha of the fixed platen 11. Since the ring 12 is made of a material characterized by higher toughness than the material of the fixed platen 11, it is not easily deformed even when brought in contact with the mold set 20. Further, when the mold set 20 is mounted, a sufficient clearance is obtained, and heavy rubbing does not possibly occur. When the mold is replaced in the general case, the ring 12 is not removed. Accordingly, there is very little possibility of the fixed platen 11 being deformed by the ring 12. This means that the possibility of deformation is prevented even when the fixed platen 11 is made of cast iron.

It is to be expressly understood that the embodiment of the present invention having been described is only an example and the present invention is not restricted thereto. The present invention can be embodied in a great number of variations with appropriate modifications or additions, without departing from the technological spirit and scope of the invention claimed.

For example, positioning between the fixed side mounting plate 21 and fixed platen 11 has been described with reference to the aforementioned embodiment. When the same structure is provided on the movable platen side as well, positioning accuracy between the movable platen 29 and movable mold can be further improved. Further, when the mold setup is performed separately on the fixed and movable sides, it becomes possible to improve the reproducibility of axis misalignment resulting from the mold setup operation. When the structure is provided on the movable platen 29, the locating hole need not be a through-hole, and a spool need not be used. Further, the ring 12 used in the aforementioned embodiment is annular, but can be semi-annular. For example, it can be in the form of a letter C. The method of adjusting the temperatures of the fixed platen 11, fixed mold 27, and others is not restricted to the use of a medium type temperature controller 31. For example, an electrothermal transducer can also be employed for this method.

The mold assembly for optical parts and the method for setup thereof minimize the time-dependent reduction in positioning accuracy and further enhance the positioning accuracy in molding operation.

What is claimed is:

1. A setup method of a mold assembly for optical parts, in which a fixed mold and a movable mold are clamped while adjusting a temperature so as to inject a molding material into a molding cavity provided between the fixed mold and the movable mold to produce an optical part, the setup method using:

the fixed mold and the movable mold, at least one of which includes a locating projection protruding toward a side opposite to a mold matching surface;

a holding member for holding at least one of the fixed mold and the movable mold, the holding member having a locating hole formed on a part of a surface of the holding member on a mold side; and a locating member which is formed of a material having a smaller linear expansion coefficient than linear expansion coefficients of materials of the holding member and the locating projection and which has external and internal surfaces, the external surface being adapted to be fitted into the locating hole and the internal surface being adapted to be fitted by the locating projection;

the setup method comprising:

a first step for making adjustment to obtain a first temperature of the holding member meeting a following relationship:

$t1+40 \leq$ first temperature $\leq t1+60°$ C.

wherein "t1" indicates a temperature of the holding member at a time of molding an optical part in the mold assembly;

a second step for installing the locating member in the holding member under a temperature condition obtained in the first step;

a third step of adjusting a temperature of the holding member within a range of $t1 \pm 5°$ C. and adjusting a temperature of at least one of the fixed mold and the movable mold to a second temperature meeting a following relationship:

Second temperature $\leq t1-10°$ C.;

a fourth step for mounting the locating member with the locating projection of at least one of the fixed mold and movable mold under a temperature condition obtained in the third step; and a fifth step for adjusting a temperature of at least one of the fixed mold and the movable mold within a range of $t2 \pm 5°$ C. wherein "t2" denotes a temperature of at least one of the fixed mold and the movable mold at a time of molding an optical part in the mold assembly.

2. The setup method of a mold assembly for optical parts of claim 1, wherein 10° C. $\leq$ the second temperature.

3. The setup method of a mold assembly for optical parts of claim 1, wherein the holding member in which a diameter of the locating hole is larger than a diameter of the external surface of the locating member by a range from 20 through 60 μm at the first temperature is used, and wherein the at least one of the fixed mold and the movable mold in which a diameter of the locating projection at a room temperature is smaller than a diameter of the internal surface of the locating member at the second temperature by a range from 15 through 90 μm is used.

4. A setup method of a mold assembly for optical parts, in which a fixed mold and a movable mold are clamped while adjusting a temperature so as to inject a molding material into a molding cavity provided between the fixed mold and the movable mold to produce an optical part, the setup method using:

the fixed mold and the movable mold, at least one of which comprises a locating projection protruding toward a side opposite to a mold matching surface;

a holding member for holding at least one of the fixed mold and the movable mold, the holding member having a locating hole formed on a part of a surface of the holding member on a mold side; and a locating member which is formed of a material having a smaller linear expansion coefficient than linear expansion coefficients of materials of the holding member and the locating projection, and which has external and internal surfaces, the external surface being adapted to be fitted into the locating hole and the internal surface being adapted to be fitted by the locating projection;

the setup method including:

a first step for adjusting a temperature of the holding member within a range of $t1+5°$ C. and for adjusting a temperature of at least one of the fixed mold and the movable mold to a second temperature meeting a following relationship, in a state wherein the holding member is mounted with the locating member and the locating member is mounted with the locating projection of at least one of the fixed mold and the movable mold:

Second temperature $\leq t1-10°$ C.;

a second step for removing the locating projection of at least one of the fixed mold and the movable mold from the locating member under a temperature condition obtained in the first step;

a third step for adjusting a temperature of the holding member to a first temperature meeting a following relationship:

$t1+40 \leq$ first temperature $\leq t1+60°$ C.; and a fourth step for removing the locating member from the holding member under a temperature condition obtained in the third step.

5. The setup method of a mold assembly for optical parts of claim 4, wherein 10° C. $\leq$ the second temperature.

6. The setup method of a mold assembly for optical parts of claim 4, wherein the holding member in which a diameter of the locating hole is larger than a diameter of the external surface of the locating member by a range from 20 through 60 μm at the first temperature is used, and wherein the at least one of the fixed mold and the movable mold in which a diameter of the locating projection at a room temperature is smaller than a diameter of the internal surface of the locating member at the second temperature by a range from 15 through 90 μm is used.

7. A mold assembly for optical parts, comprising:

a first mold which is clamped with an opposed mold while adjusting a temperature so as to inject a molding material into a molding cavity provided between the first mold and the opposed mold to produce an optical part, the first mold being located on a fixed side or a movable side;

a second mold which is the opposed mold;

a holding member for holding the first mold, the holding member having a locating hole formed on a part of a surface of the holding member on a first mold side; and a locating member having external and internal surfaces, the external surface being adapted to be fitted into the locating hole, wherein a locating projection which is adapted to be fitted into the internal surface of the locating member with the locating projection protruding toward the holding member is formed on the first mold, and wherein the locating member is formed of a material having a smaller linear expansion coefficient than linear expansion coefficients of the holding member and the locating projection.

8. The mold assembly for optical parts of claim 7, further comprising, a temperature adjusting device for controlling a temperature of the holding member.

9. The mold assembly for optical parts of claim 7, wherein the linear expansion coefficient of the material forming the locating member is $5 \times 10^{-6}$/K or less.

10. The mold assembly for optical parts of claim 7, wherein the first mold is on the fixed side and the second mold is on the movable side.

11. The mold assembly for optical parts of claim 7, wherein the first mold is on the movable side and the second mold is on the fixed side.

12. The mold assembly for optical parts of claim 7, further comprising:

a second holding member for holding the second mold, the second holding member having a second locating hole formed on a part of a surface of the second holding member on a second mold side; and a second locating member having external and internal surfaces, the external surface being adapted to be fitted into the second locating hole, wherein a second locating projection which is adapted to be fitted into the internal surface of the second locating member with the second locating projection protruding toward the second holding member is formed on the second mold and wherein the second locating member is formed of a material having a smaller linear expansion coefficient than linear expansion coefficients of the second holding member and the second locating projection.

\* \* \* \* \*